United States Patent

Mändl et al.

[11] Patent Number: 6,069,685
[45] Date of Patent: May 30, 2000

[54] METHOD AND APPARATUS FOR PRINTING HIGH QUALITY PRINTS FROM PHOTOGRAPHIC NEGATIVES

[75] Inventors: Matthias Mändl, Grosshelfendorf; Steffen Schubert, Gera, both of Germany

[73] Assignee: AGFA-Gevaert AG, Leverkusen, Germany

[21] Appl. No.: 08/857,403

[22] Filed: May 16, 1997

Related U.S. Application Data

[63] Continuation of application No. 08/384,158, Feb. 6, 1995, abandoned.

[30] Foreign Application Priority Data

Feb. 16, 1994 [DE] Germany .............................. 44 04 900

[51] Int. Cl.⁷ ............................ G03B 27/52; G03B 27/80
[52] U.S. Cl. ................................ 355/68; 355/38; 355/41; 355/77
[58] Field of Search .................................. 355/27, 28, 29, 355/35, 38, 40, 41, 42, 68, 77, 18

[56] References Cited

U.S. PATENT DOCUMENTS

| | | |
|---|---|---|
| 4,150,894 | 4/1979 | Meyer et al. . |
| 4,279,502 | 7/1981 | Thurm et al. . |
| 4,797,713 | 1/1989 | Tershita et al. ............................ 355/77 |
| 5,029,312 | 7/1991 | Goenner ..................................... 355/38 |
| 5,192,970 | 3/1993 | Findeis et al. . |
| 5,357,315 | 10/1994 | Suzuki ..................................... 355/77 |
| 5,561,494 | 10/1996 | Terashita ................................... 355/38 |

FOREIGN PATENT DOCUMENTS

| | | |
|---|---|---|
| 0468533 | 1/1992 | European Pat. Off. . |
| 0475897 | 3/1992 | European Pat. Off. . |
| 2747527 | 4/1979 | Germany . |
| 54-26729 | 2/1979 | Japan ............................. G03B 27/32 |
| 59-83280 | 5/1984 | Japan ............................. G03B 27/46 |

*Primary Examiner*—Alan A. Mathews
*Attorney, Agent, or Firm*—Milde, Hoffberg & Macklin, LLP

[57] ABSTRACT

A method and apparatus for printing high quality prints from photographic negatives employ a printer with a system that scans the negatives optical densities region by region. Corresponding quantities of light are calculated, the first prints are then printed using these quantities, and thereafter these quantities are stored in a memory to be retrieved at a later time for duplicate prints. To locate the stored values representing the first printing light quantities, the densities employed to calculate the light quantities are associated with those quantities in the memory. The negatives are scanned again when the subsequent prints are to be printed. The measured densities are then compared with the densities stored during the first printing process. If and when the results are similar, the identity of the two negatives is confirmed and the first printing light quantities are obtained from the memory and employed for producing the subsequent prints.

32 Claims, 5 Drawing Sheets

METHOD AND APPARATUS FOR PRINTING HIGH QUALITY PRINTS FROM PHOTOGRAPHIC NEGATIVES

This application is a continuation, of application Ser. No. 08/384158 filed Feb. 6, 1995, now abandoned.

BACKGROUND OF THE INVENTION

The present invention concerns a method of, and apparatus for printing high quality prints from photographic negatives.

Professional photographers in particular, and especially portrait and business photographers, need high quality prints. Such photographers usually show their customers optimal quality proofs to select from. To ensure customer satisfaction, the subsequent prints absolutely must have the same coloration and mean density as the first prints (proofs), even when improvements over these first prints are possible and may be desirable. Even when the light quantities employed for the first prints is determined by scanning and processing in the manner described in the German Patent No. 2,840,287 and its corresponding U.S. Pat. No. 4,279,502, and when the duplicate prints are printed on the same automatic equipment that produced the original prints submitted to the customer, slight displacements of the negative in relation to the scanner can lead to distortions in color balance. Professional photographers accordingly attempt to store the light quantities employed in producing the first prints in order to employ them again to produce subsequent prints. A method of this type is known from the German Patent Publication No. OS 4,031,022 and its corresponding U.S. Pat. No. 5,192,970.

A strip of material containing machine-readable addresses is attached to the negatives. Information representing optimal light quantities is stored in a memory along with the addresses. It can be assumed that customers will order their subsequent prints soon after seeing the first prints, and the light quantities will not need to be stored for much longer than three months. When the subsequent prints are to be made, the correct light quantities for each can be extracted from the memory by referring to the addresses on the data strip.

This method has certain drawbacks. The photographic negative strips must have data strips attached to them, which many customers do not like. It is impossible to ensure that the strips will still be attached when an order is to be processed. Attaching the strips to the negatives before the first printing process requires extra work. Similar methods may also be used with the address information applied to the back of the first prints (proofs). The problem in this case is that the proofs are not always returned with the negatives.

SUMMARY OF THE INVENTION

A principal object of the present invention is to provide an especially simple method and apparatus for storing and subsequently recalling light quantities for photographic printing.

This object, as well as other objects which will become apparent from the discussion that follows, are achieved, in accordance with the present invention, by a method and apparatus for printing high quality prints from photographic negatives which employ a printer with a system that scans the negatives' optical densities region by region. Corresponding quantities of light are calculated, the first prints are then printed using these quantities, and thereafter these quantities are stored in a memory to be retrieved at a later time for duplicate prints. To locate the stored values representing the first printing light quantities, the densities employed to calculate the light quantities are associated with those quantities in the memory. The negatives are scanned again when the subsequent prints are to be printed. The measured densities are then compared with the densities stored during the first printing process. If and when the results are similar, the identity of the original and subsequently scanned negatives is confirmed and the first printing light quantities are obtained from the memory and employed for producing the subsequent prints.

Using the scanning results obtained from the first printing process as addresses for storing the associated light quantities eliminates the need for a separate addressing system. The local densities already employed to determine light quantities are exploited as addresses for recalling the light quantity data originally obtained when printing the proofs.

In one preferred embodiment of the present invention corresponding measurement regions of the respective negatives are compared and similarity is confirmed by totaling the results. This procedure is made particularly simple by the use of a correlation function.

Apparatus for carrying out the method according to the invention includes a light-quantity memory for storing optical densities and light quantities associated with a particular negative and a comparator that compares the stored densities with the densities detected in a negative to be printed from. When the densities are similar, they will simultaneously be exploited as addresses for retrieving light quantities from the memory. In one particular advantageous embodiment of the present invention there is also a working memory arranged between the light-quantity memory and the comparator. Stored in this working memory are measured density data from those few negatives having characteristics that are easily detected and which compare with the negative being investigated, such as format, customer name, brand of film, integral density, and/or subject matter.

Further details about, and advantages of, the present invention will be evident from the embodiment that will now be described by way of example with reference to the accompanying drawing.

DESCRIPTION OF THE PREFERRED EMBODIMENT

Figure 1:
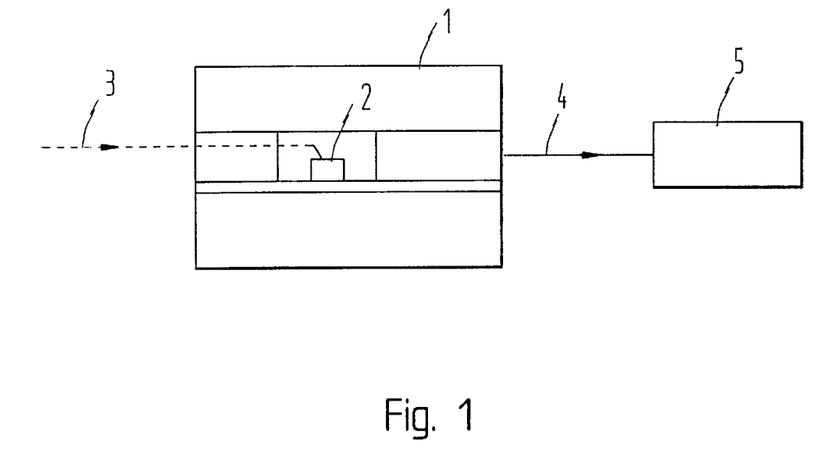
FIG. 1 is a block diagram illustrating apparatus in accordance with the present invention during the first printing process.

Referring to FIG. 1, the reference numeral 3 identifies a strip of master or original photographs. The strip 3 is here assumed to be an exposed and developed filmstrip having negatives which constitute the masters or originals. The filmstrip 3 may be an uncut film of normal length which exits an appropriate developing apparatus or it may be constituted by a series of similar films which have been joined end-to-end so as to form an extended filmstrip. The photographic negatives are passed to apparatus of the type disclosed in the U.S. Pat. No. 5,192,970, the subject matter of which is incorporated herein by reference. The apparatus comprises a lower lamp housing and a roll copier device called a "printer" 1 in an upper housing.

The photographic negatives 3 are inserted successively into a "presentation stage" in the lower lamp housing which exposes a strip of light-sensitive paper in the printer 1.

Accommodated in the presentation stage is a scanner 2. The scanner 2 scans each photographic negative region by region —i.e., at a multiplicity of points—for densities of the primary colors. There are typically 16×30=480 points per photographic negative picture. Each such point will have an optical color density with respect to green, red or blue. The light quantities for each color that will result in satisfactory prints at an average distribution of densities in the negative is calculated from these approximately 500 points in accordance with the theory disclosed in the German Patent No. 2,840,287.

The arrow indicated along the path of travel represents the direction of motion of the filmstrip 3 bearing the photographic negatives from an unillustrated processing station toward the presentation stage where the negatives are scanned. Illumination at the calculated light quantities occurs later in the same stage. A random access memory 5 receives these light quantities by way of a data transmission line 4. The measured density values of the scanned regions are also entered into the memory 5 together with the addresses of the calculated light quantities. This procedure can be accompanied by data reduction (data compression) in the manner described hereinbelow.

Figure 2:
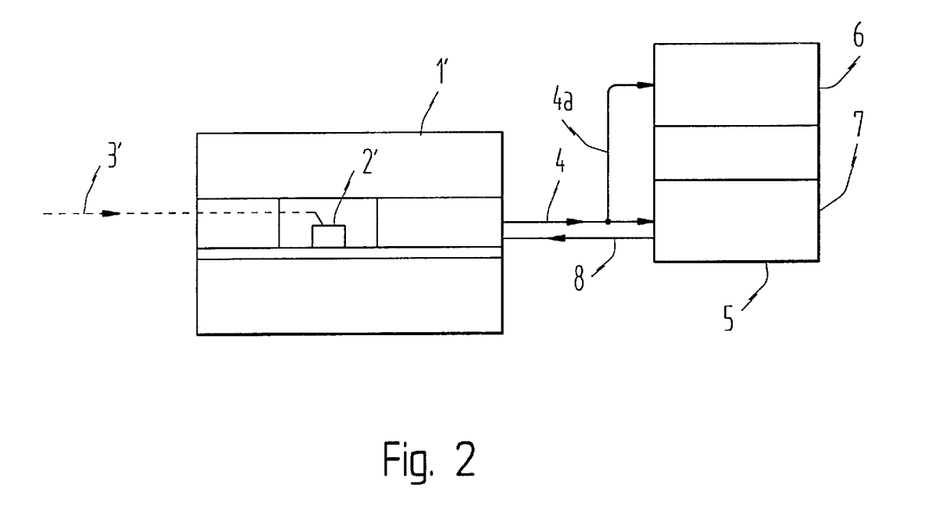
FIG. 2 is a block diagram, similar to FIG. 1, illustrating the apparatus in a configuration appropriate for successor prints.

FIG. 2 illustrates a configuration of the apparatus for printing subsequent prints. A printer 1' and scanner 2' are essentially identical to the printer 1 and scanner 2 illustrated in FIG. 1 There is, however, another connection to the data memory 5 in the form of a line 8 for transmitting the calculated light quantity data, read from the memory 5, to the printer 1'.

Connected to data memory 5 is a working memory 7 and a comparator 6. Measured values from the scanner 2' are conveyed to the comparator 6 over the data transmission line 4 and a branch line 4a.

The operation of the apparatus described above will now be explained.

Negatives 3 coming from processing arrive at the scanner 2 illustrated in FIG. 1 where, in addition to the densities of the regions, other order-relevant information such as format, customer number, film brand (from the DX code of a 135 mm film), type of subject, and other easily detected characteristics are determined. This information is stored in the memory 5 along with the light quantities and densities employed for printing the first prints. However, not all 500 points for each color are usually stored; rather the data are preferably reduced. The first step in such data reduction is preferably to construct a gray density by obtaining a mean of the three colors. The number of points can also be reduced to approximately 10×4=40 density values per picture by constructing "macropixels" of up to nine pixels each, for example. The density values of such macropixels are determined by averaging the densities of up to nine adjacent pixels. The macropixels do not overlap but adjoin each other. It is also possible to scan the edges of the negative, which are less significant to the overall image, with larger macropixels and to use smaller ones for the center of the picture where the more important subject matter is usually located. This number of 40 image points requires only 8 megabytes of memory for a maximum of 100,000 negatives occurring in one printer per quarter year. Experience demonstrates that even for 40 test values, it is still possible to reliably distinguish between negatives photographed in a single sequence with the same subject in front of the same background: a series of portraits, for example.

When a particular picture is ordered, it is first determined whether the corresponding photographic negative 3 has been in the printer during the last quarter year; that is, whether it is part of the stock of 100,000 data sets. For this purpose the recently detected density values are compressed into grays and macropixels until approximately 40 values remain. A considerable reduction in the amount of image data to be compared can be achieved if the easily detected data on the negative—such as the photographic negative format, customer identification (name or number), brand of photographic film, integral density (defined below), and subject matter (portrait, party photography, scenery)—are entered into the light quantity memory 5 by way of the data transmission line 4 and only the data relating to the photographic negatives that are similar with the negative being investigated in accordance with these criteria are copied from that memory into the working memory 7. The stock of 100,000 data sets stored in memory can be reduced in this way by one or two powers of ten with high probability. The 40 compressed densities simultaneously enter the comparator 6 over line 4a. Here the content of working memory 7 is compared with the 40 values detected for the negative in question arriving over line 4a.

When the negative is scanned the second time to obtain the density values for comparison with those in memory, it is inserted in the presentation stage first in one direction and then in a second, opposite direction. This insures that a comparison is not missed because, when the negative was originally scanned, it was turned 180° with respect to its position when scanned a second time.

According to the preferred embodiment, the comparison of optical densities is carried out using a correlation function having the formula:

$$C(x, y) = \frac{\sum ((x - \bar{x})(y - \bar{y}))}{\sqrt{\sum (x - \bar{x})^2 \sum (y - \bar{y})^2}} \quad (1)$$

$$\bar{x} = \frac{\sum x}{n}$$

$$\bar{y} = \frac{\sum y}{n}$$

wherein n is the number of measurement points—that is, the macropixels—wherein x and y represent their respective densities for the measured negative (x) and a negative stored in memory (y), and wherein $\bar{x}$ and $\bar{y}$ are so-called "integral densities" representing the individual measured or stored densities, respectively, averaged over the negative. The comparison is always conducted between an x and a y corresponding to specific locations in the photographic negative. The compression into macropixels lowers the demands on positional correspondence below what is required for calculating light quantities based on the scanned data.

The value C graphically represents the probability that the populations x and y are related or interdependent. If all x and y are identical, C=1. If x and y represent random sets with minimal similarity, C<0. C is, however, independent of the scaling of the sets of data being compared, meaning that the C of x and y is C(x, ay)=C (ax, y) where ar≠0. In the actual examination of the association—that is, in the actual comparison—the device calculates the correlations $C_i(x, y_i)$ between the scanning data x of the photographic negative being reproduced and all data $y_i$ in the system memory. The photographic negative represented by the data in memory with the highest value C must accordingly be the negative similar to the negative being investigated (scanned), if there is indeed any similar negative data stored in the memory. To confirm this, similarity is assumed, for example, only when C is at least 0.85, for example. If this minimum value is not reached, the retrieval of light quantity data from memory 5 is discontinued and a new calculation is carried out.

Practical tests have revealed that comparisons employing such a correlation function can be carried out very rapidly using an ordinary 486 processor of the type accommodated in the more powerful personal computers. At an operating speed of 35 MHz, the 40 pixel values can be compared with the data for 1000 pictures in approximately 0.2 seconds. Since it takes just as long to calculate exposure time, no time is sacrificed.

Once it has been determined in the comparator 6, on the basis of comparison of the pixel densities from line 4a as illustrated in FIG. 2, which of the stored negatives are extensively similar to the measured photographic negative, the identity is confirmed and the associated light quantities are forwarded to the printer 1' from the memory 5 by way of the data transmission line 8 for exposure of the photographic negative in the scanning station 2'.

Since the size of the memory 5 is limited and since comparison would take too long if there were too many data sets, it is possible to exploit the fact that pictures are usually ordered within four weeks or less of the presentation of proofs and almost never after a period longer than three months, so that older light quantity data can be erased to make room for newer information.

Figure 3:
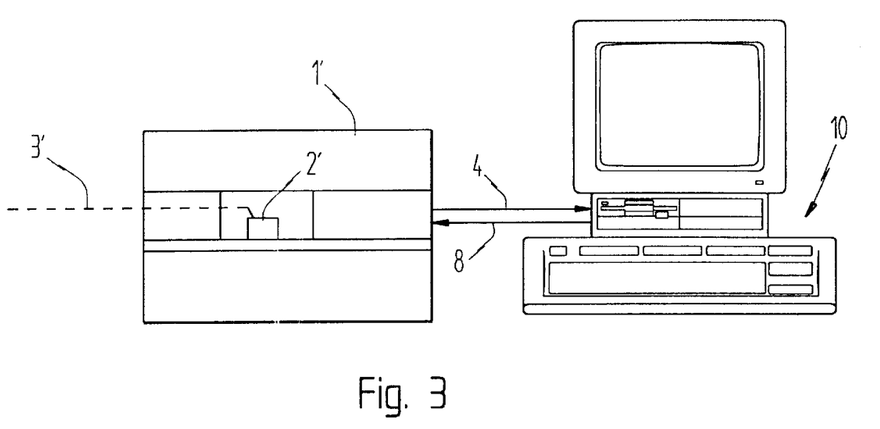
FIG. 3 is a block diagram similar to FIG. 1, illustrating the apparatus which incorporates a conventional digital computer.
Figure 4:
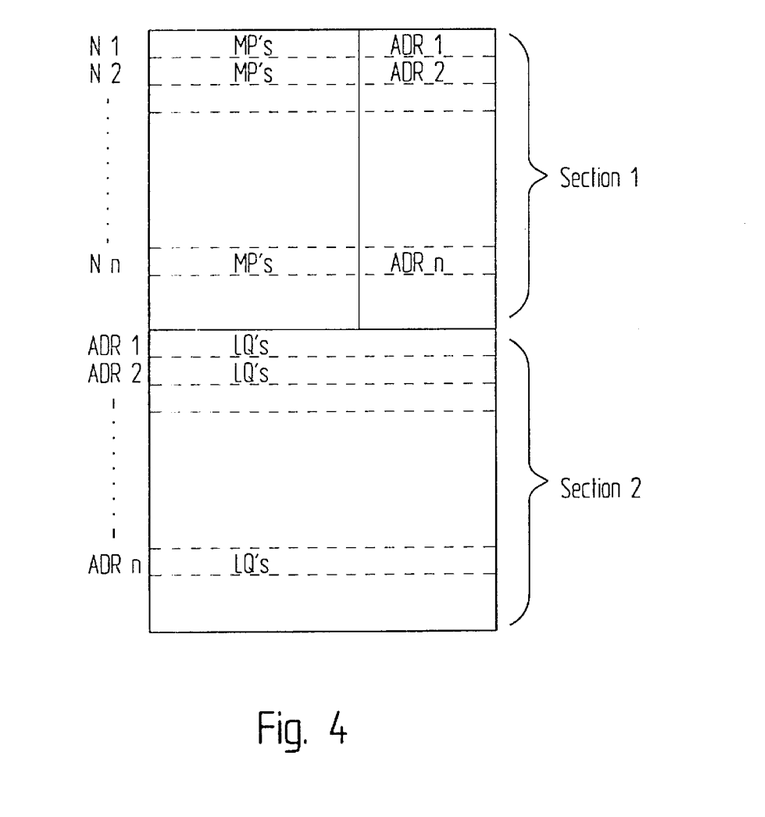
FIG. 4 is a diagram of memory locations in the digital computer of FIG. 3.

FIG. 3 illustrates the system of FIG. 2 in which a digital computer (personal computer) 10 replaces the memories 5 and 7 and the comparator 6 in FIG. 2. This personal computer includes an Intel 486 or a Pentium processor operating at least 35 MHz. FIG. 4 shows how the memory of the computer 10 may be organized. In this figure "MP" stands for "macropixel"; "ADR" stands for "address"; "LQ" stands for "light quantity" and "N1, N2 ... Nn" stands for Negative No. 1, Negative No. 2... Negative No. n. As may be seen, the memory is divided into sections commencing at known addresses. Section 1 is large enough to store both the macropixels (MPs) and an associated address (ADR) of each one of a large number (n) of negatives. Thus, for each negative Ni there is stored in Section 1 of memory a plurality (e.g., 40) macropixel density values and an associated address (ADRi). This address points to a place within Section 2 of the memory which contains the light quantities (LQs) for that particular negative.

Figure 5:
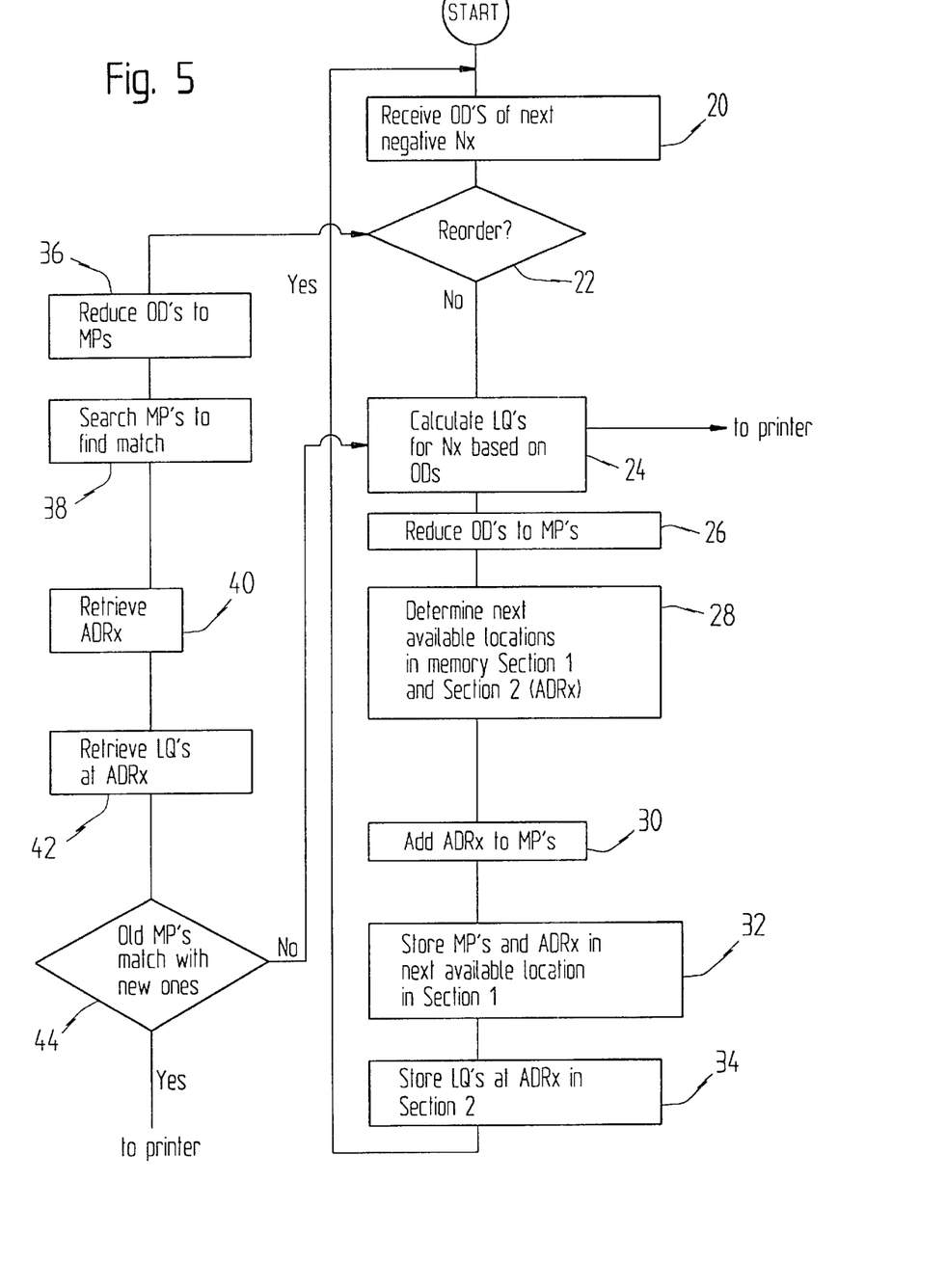
FIG. 5 is a flow chart illustrating the operation of the digital computer of FIG. 3.

FIG. 5 is a flow chart showing the general operation of the system. In the case of a new negative (Nx) the optical densities (ODs) are first measured and transmitted to the computer 10. The computer receives these ODs of negative Nx (Block 20) and first determines whether this is a new negative being scanned for the first time or a reorder of prints from a previously scanned negative (Block 22). The determination whether the negative is new or belongs to a reorder can simply be based on the fact that the film at order entry was undeveloped or already developed. If the negative Nx is being scanned for the first time, the light quantities (LQs) are calculated based on the ODs (Block 24). These LQs are passed back to the printer 1' to produce the original proofs. Thereafter, the ODs are processed into macropixels (MPs) (Block 26) by averaging groups of ODs in the manner described above. Next, the next available locations in memory Sections 1 and 2 are determined (Block 28), giving the address (ADRx) in Section 2, and this address ADRx is added to the group of MPs (Block 30). The MPs and ADRx are then stored in the next available location in Section 1 (Block 32) and the LQs are stored at the address ADRx in Section 2 (Block 34).

If the negative Nx is, in fact, a reorder, the ODs are first reduced to MPs (Block 36) and the MPs are searched against the MPs in Section 1 to find a match (Block 38). If a match is found, the stored address ADRx is retrieved (Block 40) and used to retrieve the LQs (Block 42) for that negative. If, after all the stored MPs are searched, no match is found (Block 44) the LQs are calculated for the negative Nx based on the ODs (Block 24). If a match is found and the LQs are retrieved, the LQs are transmitted to the printer 1' to produce the new print.

Figure 6:
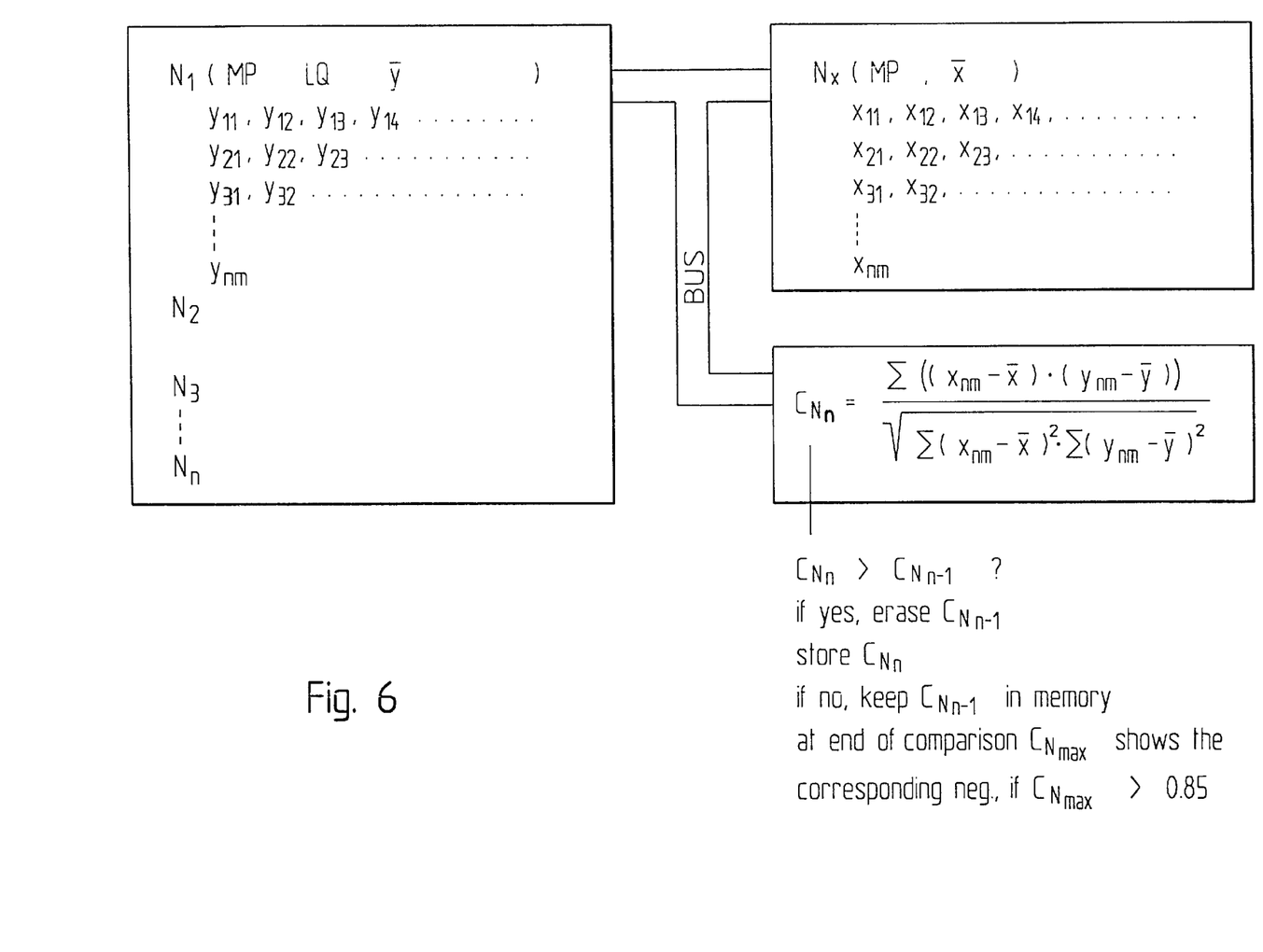
FIG. 6 is a diagram illustrating the operation of the computer in FIG. 3 in a preferred embodiment of the invention.

FIG. 6 illustrates the process of searching the MPs to find a match using the correlation function C given above as equation (1). The respective optical densities for the macropixels for each given negative form a matrix of (e.g. 40) values. For the values y stored in memory for a given negative, the values are:

$y_{11}, y_{12}, y_{13}, y_{14} \cdots$
$y_{21}, y_{22}, y_{23} \cdots$
$y_{31}, y_{32} \cdots$
$Y_{nm}$ The measured values x also form a similar matrix.

The stored values in Section 1 of the memory are used by the computer 10 to calculate $C_{Nn}$ using the formula of the equation (1). If $C_{Nn}$ is greater than $C_{Nn-1}$, then $C_{Nn}$ is stored in place of $C_{Nn-1}$. If $C_{Nn}$ is less than or equal to $C_{Nn-1}$, then $C_{Nn-1}$ is retained in memory.

After all the Cs have been calculated, the maximum C retained in memory is compared to the value 0.85. If C is greater than or equal to 0.85, then it is assumed that a match has been found. If not, no match has been found and the LQs for the negative must be calculated anew based on the ODs.

Figure 7:
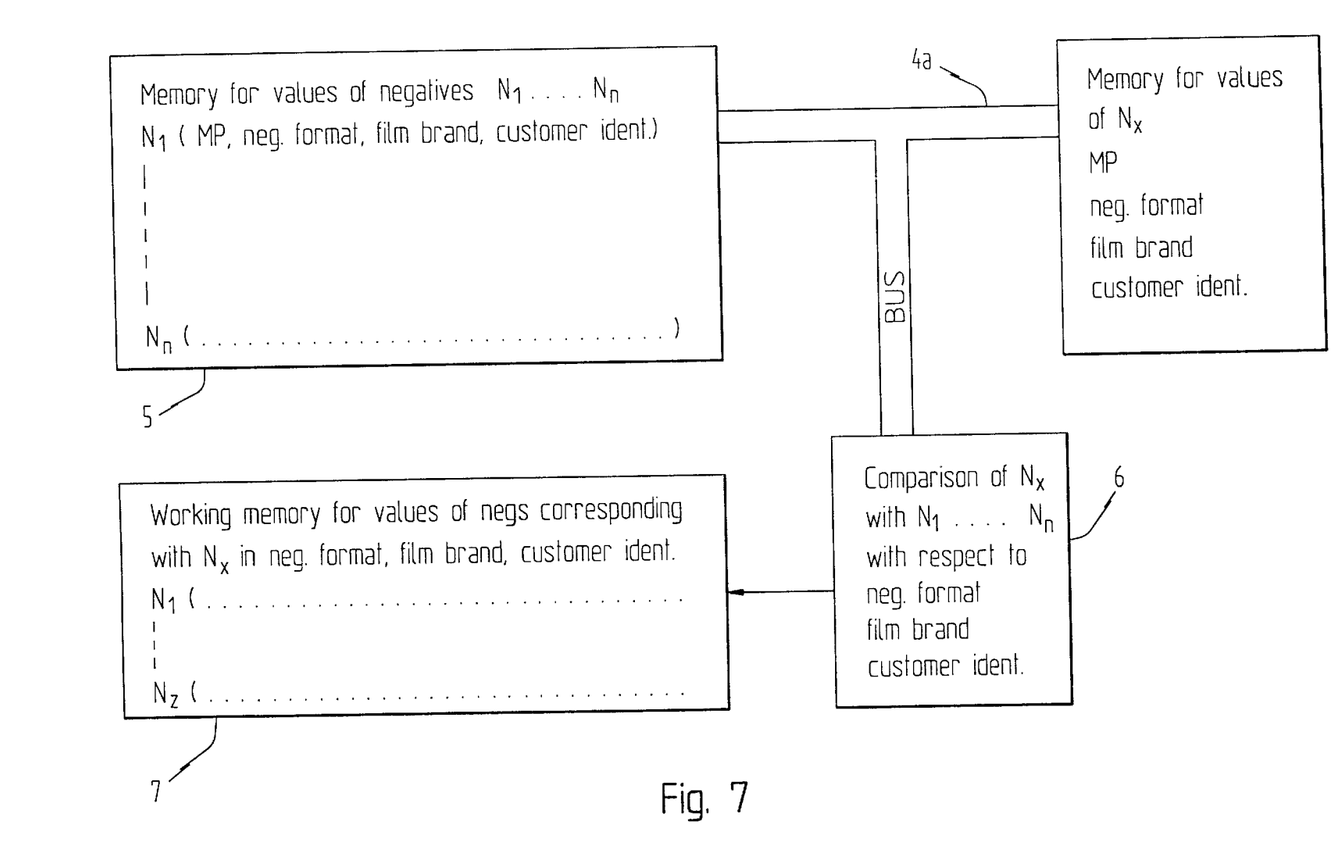
FIG. 7 is a diagram illustrating the operation of the computer of FIG. 3 in another preferred embodiment of the present invention.

FIG. 7 illustrates how easily detected criteria, such as photographic negative format, film type and customer ID, may be used to shorten and simplify the MP matching process. In this case, an initial comparison is made, by comparator 6, of the easily detected criteria of the measured negative Nx with the similar information for the negatives N1 . . . Nn stored in the memory 5. Whenever a match occurs, the detailed macropixel data for that stored negative is retrieved and stored in separate section 7 of memory—called the "working memory"—to form a subsidiary set of data. This reduced subsidiary set of data is thereafter searched in the manner described above in connection with FIG. 6.

The method and apparatus described herein for locating stored light quantity data can also be employed for remakes —that is, redone versions and reproductions of unsatisfactory prints—as well as for reordering previously made prints. The printing scale can also be stored in memory 5 along with the light quantities and the precise position of the negative during the initial printing process, in the form of x and y coordinates obtained from the negative in the presentation stage, and along with any photographically imaged or mechanically printed texts or numbers, to ensure that any picture ordered later will be identical with the first and that the customer can order such pictures later.

There has thus been shown and described a novel method and apparatus for printing high quality prints from photographic negatives which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of printing high quality prints from photographic negatives, whereby light quantities are calculated in first printing apparatus with a device for locally scanning the negatives to measure the optical densities thereof, calculating the light quantities from the optical densities, producing first prints using the calculated light quantities and storing values representing the light quantities in a memory for later retrieval for subsequent prints, the improvement comprising a method of locating the stored values representing the first printing light quantities in said memory, said location method comprising the steps of storing the optical densities measured during the first printing process in said memory in association with the light quantities calculated from those optical densities; scanning the negatives again when the subsequent prints are to be printed, to measure the optical densities thereof; comparing the measured densities with the densities stored during the first printing process by performing a separate comparison of the measured and stored optical densities in a plurality of measurement regions that correspond in position, and determining the similarity thereof by calculating a total value for the similarity of the two negatives from the results of the individual comparisons; and, when the total value indicates an identity of negatives, using the first printing light quantities stored in the memory for the subsequent prints.

2. The method defined in claim 1, wherein the separate comparison of the measured and stored optical densities in the measurement regions that correspond in position is carried out twice, with the measured and stored densities provided for the second comparison in a sequence opposite to that of the first comparison, thereby to locate the stored values of negatives which were rotated 180° in second printing process with respect to the first printing process.

3. The method defined in claim 1, wherein the comparing step is carried out by calculating a correlation function using a digital computer.

4. The method defined in claim 3, wherein said digital computer includes an Intel 486 processor.

5. The method defined in claim 3, wherein the correlation function is:

$$C(x, y) = \frac{\sum ((x - \bar{x})(y - \bar{y}))}{\sqrt{\sum (x - \bar{x})^2 \sum (y - \bar{y})^2}}$$

-continued $$\bar{x} = \frac{\sum x}{n}$$

$$\bar{y} = \frac{\sum y}{n}$$

wherein C is between 0 and 1 with C=1 representing absolute identity and C<0 representing minimal similarity; wherein x represents the measured densities at the respective measurement regions, stored in memory, and y represents the measured densities at the corresponding measurement regions of the negative scanned when the subsequent prints are to be printed; wherein $\bar{x}$ and $\bar{y}$ respectively represent the individual measured or stored densities averaged over the negative, and wherein n is the number of measured values per negative.

6. The method defined in claim 1, further comprising the step of reducing the number of densities determined in the scanning process.

7. The method defined in claim 6, wherein the reducing step includes constructing pixel gray values.

8. The method defined in claim 6, wherein the reducing step includes constructing macropixels.

9. The method defined in claim 6, wherein the reducing step includes reducing the number of densities by approximately a factor of nine.

10. The method defined in claim 8, wherein the macropixels at the edge of the photographic negative are made larger than those at the center.

11. The method defined in claim 1, further comprising the steps of storing easily detected criteria in the memory in association with the respective negatives; and, prior to comparison of the negatives in accordance with photographic negatives, constructing a subsidiary set of data out of the total quantity of photographic negative data available and storing the same in a working memory, wherein the negatives associated with the subsidiary set of data are similar to the negative being investigated in accordance with the easily detected criteria, and wherein the region-by-region comparison is restricted to the subsidiary set of data of the negatives.

12. The method defined in claim 11, wherein the easily detected criteria include the photographic negative format.

13. The method defined in claim 11, wherein the easily detected criteria include the identification of the photographic customer.

14. The method defined in claim 11, wherein the easily detected criteria include the brand of the photographic negative.

15. The method defined in claim 11, wherein the easily detected criteria include the integral density of the photographic negative.

16. The method defined in claim 11, wherein the easily detected criteria include the subject matter of the photographic negative.

17. In apparatus for printing high quality prints from a photographic negative according to the method of claim 1, said apparatus including a photographic printer, an optical density measuring device for region-by-region density measurement of the negative, a light quantity memory and a computer for calculating the light quantities from the measured densities for use in printing and for storing the same in the memory, wherein the light quantities for a plurality of photographic negatives which are processed for printing are retained in the memory for use in subsequent printing, the improvement comprising means for storing the measured densities in the memory in association with the light quantities of a given negative; comparator means for comparing the stored densities with the measured densities of the negative to be printed for a second time; and means for retrieving from memory the associated light quantities when the compared stored densities and measured densities are similar;

whereby the printer prints duplicate photographs with the light quantities retrieved from the memory.

18. The apparatus defined in claim 17, further comprising an operations memory; means for detecting further identification information on the negative; means for storing the identification information in the light quantity memory; means for storing the measured densities in the operations memory; means for comparing the detected identification information with prior stored identification information in the light quantity memory; and means for retrieving the densities from the operations memory for a negative for which the detected identification information is the same as the stored identification information.

19. A method of printing high quality prints from photographic negatives, whereby light quantities are calculated in first printing apparatus with a device for locally scanning the negatives to measure the optical densities thereof, calculating the light quantities from the optical densities, producing first prints using the calculated light quantities, and storing values representing the light quantities in a memory for later retrieval for subsequent prints, the improvement comprising a method of locating the stored values representing the first printing light quantities in said memory, said location method comprising the steps of storing the optical densities measured during the first printing process in said memory in association with the light quantities calculated from those optical densities; scanning the negatives again when the subsequent prints are to be printed, to measure the optical densities thereof; comparing the measured densities with the densities stored during the first printing process by calculating a correlation function using a digital computer; and, when the results are similar, using the first printing light quantities stored in the memory for the subsequent prints.

20. The method defined in claim 19, wherein said digital computer includes an Intel 486 processor.

21. The method defined in claim 19, wherein the correlation function is:

$$C(x, y) = \frac{\sum ((x - \bar{x})(y - \bar{y}))}{\sqrt{\sum (x - \bar{x})^2 \sum (y - \bar{y})^2}}$$

$$\bar{x} = \frac{\sum x}{n}$$

$$\bar{y} = \frac{\sum y}{n}$$

wherein C is between 0 and 1 with C=1 representing absolute identity and C≦0 representing minimal similarity; wherein x represents the measured densities at the respective measurement regions, stored in memory, and y represents the measured densities at the corresponding measurement regions of the negative scanned when the subsequent prints are to be printed; wherein x and y respectively represent the individual measured or stored densities averaged over the negative, and wherein n is the number of measured values per negative.

22. A method of printing high quality prints from photographic negatives, whereby light quantities are calculated in first printing apparatus with a device for locally scanning the negatives to measure the optical densities thereof, calculating the light quantities from the optical densities, producing first prints using the calculated light quantities, and storing values representing the light quantities in a memory for later retrieval for subsequent prints, the improvement comprising a method of locating the stored values representing the first printing light quantities in said memory, said location method comprising the steps of storing the optical densities measured during the first printing process in said memory in association with the light quantities calculated from those optical densities; scanning the negatives again when the subsequent prints are to be printed, to measure the optical densities thereof; reducing the number of densities determined in the scanning process by constructing pixel gray values; comparing the measured densities with the densities stored during the first printing process; and, when the results are similar, using the first printing light quantities stored in the memory for the subsequent prints.

23. The method defined in claim 22, wherein the reducing step includes reducing the number of densities by approximately a factor of nine.

24. A method of printing high quality prints from photographic negatives, whereby light quantities are calculated in first printing apparatus with a device for locally scanning the negatives to measure the optical densities thereof, calculating the light quantities from the optical densities, producing first prints using the calculated light quantities, and storing values representing the light quantities in a memory for later retrieval for subsequent prints, the improvement comprising a method of locating the stored values representing the first printing light quantities in said memory, said location method comprising the steps of storing the optical densities measured during the first printing process in said memory in association with the light quantities calculated from those optical densities; scanning the negatives again when the subsequent prints are to be printed, to measure the optical densities thereof; reducing the number of densities determined in the scanning process by constructing macropixels; comparing the measured densities with the densities stored during the first printing process; and, when the results are similar, using the first printing light quantities stored in the memory for the subsequent prints.

25. The method defined in claim 24, wherein the reducing step includes reducing the number of densities by approximately a factor of nine.

26. The method defined in claim 24, wherein the macropixels at the edge of the photographic negative are made larger than those at the center.

27. A method of printing high quality prints from photographic negatives, whereby light quantities are calculated in first printing apparatus with a device for locally scanning the negatives to measure the optical densities thereof, calculating the light quantities from the optical densities, producing first prints using the calculated light quantities, and storing values representing the light quantities in a memory for later retrieval for subsequent prints, the improvement comprising a method of locating the stored values representing the first printing light quantities in said memory, said location method comprising the steps of storing the optical densities measured during the first printing process in said memory in association with the light quantities calculated from those optical densities; storing easily detected criteria for each negative in the memory in association with the respective negatives; when subsequent prints are to be printed from negatives, obtaining the easily detected criteria from each negative and comparing them with the stored criteria; scanning each negative again when the subsequent prints are to be printed, to measure the optical densities thereof; when the easily detected criteria of a negative is the same as the stored criteria for such negative, comparing the measured densities with the densities stored during the first printing process and, when the results are similar, using the first printing light quantities stored in the memory for the subsequent prints.

28. The method defined in claim 27, wherein the easily detected criteria include the photographic negative format.

29. The method defined in claim 27, wherein the easily detected criteria include the identification of the photographic customer.

30. The method defined in claim 27, wherein the easily detected criteria include the brand of the photographic negative.

31. The method defined in claim 27, wherein the easily detected criteria include the integral density of the photographic negative.

32. The method defined in claim 27, wherein the easily detected criteria include the subject matter of the photographic negative.

* * * * *